US011862044B1

(12) United States Patent
Milgrom

(10) Patent No.: US 11,862,044 B1
(45) **Date of Patent: *Jan. 2, 2024**

(54) FLAG DISPLAY APPARATUS

(71) Applicant: Banks Avenue, LLC, Charlotte, NC (US)

(72) Inventor: Brent M. Milgrom, Charlotte, NC (US)

(73) Assignee: BANKS AVENUE, LLC, Charlotte, NC (US)

( * ) Notice: Subject to any disclaimer, the term of this patent is extended or adjusted under 35 U.S.C. 154(b) by 188 days.

This patent is subject to a terminal disclaimer.

(21) Appl. No.: 17/370,425

(22) Filed: Jul. 8, 2021

Related U.S. Application Data

(63) Continuation of application No. 15/986,398, filed on May 22, 2018, now Pat. No. 11,062,629.

(60) Provisional application No. 62/509,867, filed on May 23, 2017.

(51) Int. Cl.
*G09F 17/00* (2006.01)
*E04H 12/32* (2006.01)

(52) U.S. Cl.
CPC ............. *G09F 17/00* (2013.01); *E04H 12/32* (2013.01); *G09F 2017/0066* (2013.01)

(58) Field of Classification Search
CPC .. G09F 17/00; G09F 2017/0066; E04H 12/32
See application file for complete search history.

(56) References Cited

U.S. PATENT DOCUMENTS 1,195,224 A 8/1916 Hoffman
1,294,032 A 2/1919 Bixby
1,337,237 A * 4/1920 Light .................... B61L 5/1872 116/173
1,339,849 A 5/1920 Johnson et al.
1,396,787 A 11/1921 Shepard
1,448,299 A 3/1923 Holliday
1,476,426 A * 12/1923 Short ...................... E04H 12/32 116/174
1,582,931 A * 5/1926 Kennedy ................ G09F 17/00 40/608
1,646,467 A 10/1927 Walton
2,072,573 A * 3/1937 Vigliotti ................. A63B 57/40 40/606.15

(Continued)

FOREIGN PATENT DOCUMENTS

WO WO-2006039925 A1 * 4/2006 ............. G09F 17/00
WO WO-2010031086 A1 * 3/2010 ........... A63B 57/357

*Primary Examiner* — John Fitzgerald
*Assistant Examiner* — Tania Courson
(74) *Attorney, Agent, or Firm* — Additon, Pendleton & Witherspoon, P.A.

(57) ABSTRACT

A flag display apparatus includes a frame comprising first and second support legs having upper and lower opposed ends when placed for display. A horizontal support member having a predetermined length can be connected to the upper end of the first and second support legs. A flag or banner having a predetermined length is attached to and supported by the frame. The predetermined length of the horizontal support member is less than the length of the flag or banner so that a portion of the flag or banner extends beyond the first or second support leg thereby providing a first portion of the flag or banner that is unfurled and a second portion of the flag or banner that is at least partially furled in the absence of wind moving across the flag.

20 Claims, 7 Drawing Sheets

(56) References Cited

U.S. PATENT DOCUMENTS

| | | | | | |
|---|---|---|---|---|---|
| 2,225,103 | A * | 12/1940 | Einermann | E04H 12/32 116/173 |
| 2,284,209 | A | 5/1942 | Holm | |
| 3,081,734 | A * | 3/1963 | Spahl | G09F 17/00 116/173 |
| 3,162,409 | A | 12/1964 | Staayer et al. | |
| 3,182,414 | A * | 5/1965 | Snediker | G09F 15/0087 40/604 |
| 3,266,458 | A | 8/1966 | Ahlquist | |
| 3,590,864 | A | 7/1971 | Vechesloff | |
| 3,715,821 | A | 2/1973 | Hawes | |
| 3,775,887 | A * | 12/1973 | Precourt | G09F 17/00 116/63 P |
| 3,995,580 | A | 12/1976 | Serrone | |
| 4,103,445 | A * | 8/1978 | Smith | G09F 7/00 248/156 |
| 4,554,885 | A | 11/1985 | Burny, Jr. | |
| 4,603,652 | A | 8/1986 | Thibault et al. | |
| 4,669,304 | A * | 6/1987 | Caragata | G01P 13/02 D10/59 |
| 4,817,319 | A * | 4/1989 | Vitale | E01F 9/658 40/610 |
| 5,509,371 | A | 4/1996 | Phillips | |
| 5,544,850 | A | 8/1996 | Fankhauser | |
| 5,572,945 | A * | 11/1996 | Eastaugh | G01P 13/02 116/173 |
| 5,667,855 | A * | 9/1997 | Borden | G09F 17/00 40/604 |
| 5,884,578 | A | 3/1999 | Thostrup et al. | |
| 5,924,669 | A | 7/1999 | Richins | |
| 6,009,652 | A * | 1/2000 | Smith | G09F 7/22 40/611.12 |
| 6,015,122 | A | 1/2000 | Qui | |
| 6,038,802 | A * | 3/2000 | Tidwell | G09F 15/0025 40/610 |
| 6,289,839 | B1 | 9/2001 | Flores | |
| 6,293,221 | B1 | 9/2001 | Kinahan | |
| 6,334,596 | B1 | 1/2002 | Temple | |
| 6,378,820 | B1 | 4/2002 | Mooney et al. | |
| 6,530,338 | B2 * | 3/2003 | Okumura | G09F 17/00 403/294 |
| 6,584,928 | B2 | 7/2003 | Kinahan | |
| 6,594,932 | B2 | 7/2003 | Hurst, Jr. et al. | |
| 6,609,476 | B1 | 8/2003 | Lorenzana et al. | |
| 6,622,649 | B1 | 9/2003 | Shaw | |
| 6,643,966 | B2 | 11/2003 | Schmitt | |
| 6,672,243 | B2 | 1/2004 | Seymour et al. | |
| 6,718,669 | B1 * | 4/2004 | Hayes | G09F 15/0068 40/610 |
| D489,291 | S * | 5/2004 | Barelli | D11/165 |
| 6,748,683 | B1 | 6/2004 | Schultz | |
| 6,792,708 | B2 | 9/2004 | Dicke et al. | |
| 6,923,141 | B1 | 8/2005 | Staats et al. | |
| 6,976,447 | B2 | 12/2005 | Spiegel | |
| 6,990,921 | B2 | 1/2006 | Milner et al. | |
| 7,017,510 | B1 | 3/2006 | Nair | |
| 7,082,889 | B2 | 8/2006 | Clark | |
| 7,100,529 | B2 | 9/2006 | Hlavin | |
| 7,128,127 | B1 | 10/2006 | Love et al. | |
| 7,171,773 | B2 * | 2/2007 | Haggard, Jr. | G09F 21/042 40/604 |
| 7,270,076 | B2 | 9/2007 | Evans | |
| 7,363,874 | B1 | 4/2008 | Arne | |
| 7,424,864 | B2 | 9/2008 | McCann | |
| 7,552,696 | B1 * | 6/2009 | DeFord | G09F 17/00 116/173 |
| 7,597,293 | B2 | 10/2009 | Houghtaling | |
| D624,847 | S * | 10/2010 | Czyzewski | D11/165 |
| 8,297,216 | B1 * | 10/2012 | Janton | G09F 17/00 116/173 |
| 8,430,052 | B2 | 4/2013 | Nihra et al. | |
| 8,474,394 | B2 | 7/2013 | Fivgas | |
| 8,695,252 | B2 | 4/2014 | Urbina | |
| 8,857,632 | B2 | 10/2014 | Anderson et al. | |
| 8,881,669 | B2 * | 11/2014 | Horvath | G09F 17/00 116/174 |
| 8,968,122 | B1 | 3/2015 | DeMarco et al. | |
| 9,390,640 | B1 | 7/2016 | Coleman | |
| 9,466,232 | B2 | 10/2016 | Woollett et al. | |
| 9,583,029 | B1 | 2/2017 | Chestnut | |
| 9,792,842 | B2 * | 10/2017 | Carson | E04H 12/2215 |
| 10,157,556 | B2 * | 12/2018 | Allen | G09F 17/00 |
| 10,226,087 | B2 | 3/2019 | Held | |
| 10,410,553 | B2 * | 9/2019 | Holyfield | G09F 17/00 |
| D900,672 | S * | 11/2020 | O'Loughlin | D11/165 |
| 11,062,629 | B1 * | 7/2021 | Milgrom | E04H 12/32 |
| 2001/0003878 | A1 | 6/2001 | Dawkins | |
| 2002/0124447 | A1 | 9/2002 | Burke | |
| 2006/0249069 | A1 | 11/2006 | McCann | |
| 2010/0064960 | A1 * | 3/2010 | Berndt | G09F 17/00 116/173 |
| 2013/0047478 | A1 * | 2/2013 | Chang | G09F 21/04 40/604 |
| 2014/0274434 | A1 * | 9/2014 | Barelli | A63B 57/40 473/176 |
| 2017/0053571 | A1 | 2/2017 | Wormser | |
| 2018/0182269 | A1 * | 6/2018 | Veazie, IV | G09F 15/0062 |

* cited by examiner

FLAG DISPLAY APPARATUS

CROSS-REFERENCE TO PRIORITY APPLICATION

The present application is a continuation of U.S. patent application Ser. No. 15/986,398 filed May 22, 2018, which claims the benefit of U.S. Patent Application No. 62/509,867 filed May 23, 2017. Each of the foregoing patent applications is incorporated herein by reference in its entirety.

FIELD OF THE INVENTION

This invention relates to a flag or banner display apparatus including a frame for supporting and displaying flags, banners, and other pliable materials bearing symbols or indicia.

BACKGROUND OF THE INVENTION

Flags and banners of all types have become common place and are routinely displayed at government buildings, commercial buildings, and residential homes. The flag of the United States and flags or banners of schools and universities are often displayed at homes. The flags or banners may be supported by a pole permanently or detachably mounted to a column or wall of a house. For special holidays, such as the Fourth of July and Veterans Day, small United States flags may be supported and displayed on a small pole or stick that is inserted into the ground.

Flags and banners can be displayed on a pole or other support member that is mounted vertically, horizontally, or at any angle between the vertical or horizontal. The United States flag is so universally recognized that it is most often displayed on poles mounted vertically. Even when sufficient wind is not present to unfurl the United States flag, it is still easily recognizable. School flags are not as easily recognized and therefore are often displayed on a pole or other support member that is mounted at some angle between vertical and horizontal so that they are displayed in an unfurled or substantially unfurled position, which allows them to be more easily seen and recognized.

There is a need for new flag or banner displays that attract attention but are less costly, more convenient to install, and/or easier to distribute in order to further promote the widespread display of flags and/or banners, and particularly the flag of the United States.

SUMMARY OF THE INVENTION

The present invention is directed to a flag or banner display apparatus configured for inserting into the ground comprising a frame supporting a flag or a banner comprising a pliable material and bearing symbols or indicia. The frame supports the flag or banner so that a portion of the flag or banner can be unfurled or substantially unfurled even in the absence of wind. The flag or banner can have any suitable shape, such as a rectangular, square, or triangular (e.g., pennant) shape. In one aspect, the frame comprises at least one support leg and a horizontal support member on which the flag or banner is disposed. The length of the horizontal member is less than the length of the flag or banner so that a portion of the flag or banner extends beyond the end of the horizontal support member. Thus, in one aspect, the flag display apparatus comprises a frame comprising at least one support leg having opposed ends and a horizontal support member having a predetermined length connected to one end of the support leg and extending therefrom. The flag or banner can have a portion having a predetermined length attached to and supported by the frame wherein the predetermined length of the horizontal support member is less than the predetermined length of the flag or banner so that the flag or banner extends a predetermined distance beyond the support leg thereby providing a first portion of the flag or banner that is unfurled and a second portion of the flag or banner that is at least partially furled in the absence of wind moving across the flag. In another aspect, the flag or banner display apparatus can include two legs attached to a flag or banner and capable of extending vertically when the flag or banner display apparatus is placed, such as in the ground, for display. The banner or flag can be attached to the two legs so that a first portion of the flag or banner extends between the two legs and a second portion is capable of extending beyond one of the legs.

The frame can comprise slender support members and/or support legs so that the frame is flexible or can comprise support members and/or support legs of sufficient diameter or thickness so that the frame is not flexible. The frame can comprise solid or tubular members.

The foregoing summary provides a few examples and is not exhaustive, and the present invention is not limited to the foregoing examples. The foregoing examples, as well as other examples, are further explained in the following Detailed Description of Preferred Embodiments.

DETAILED DESCRIPTION OF PREFERRED EMBODIMENTS

The present invention may be embodied in different forms and should not be construed as limited to the embodiments set forth herein. For example, features disclosed as a part of one embodiment can be used in the context of another embodiment to yield a further embodiment.

Figure 1:
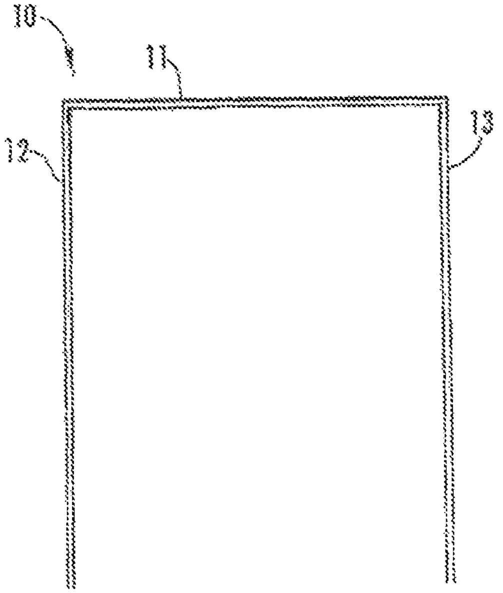
FIG. 1 is a front elevation view of the frame of a first embodiment of the present invention.
Figure 2:
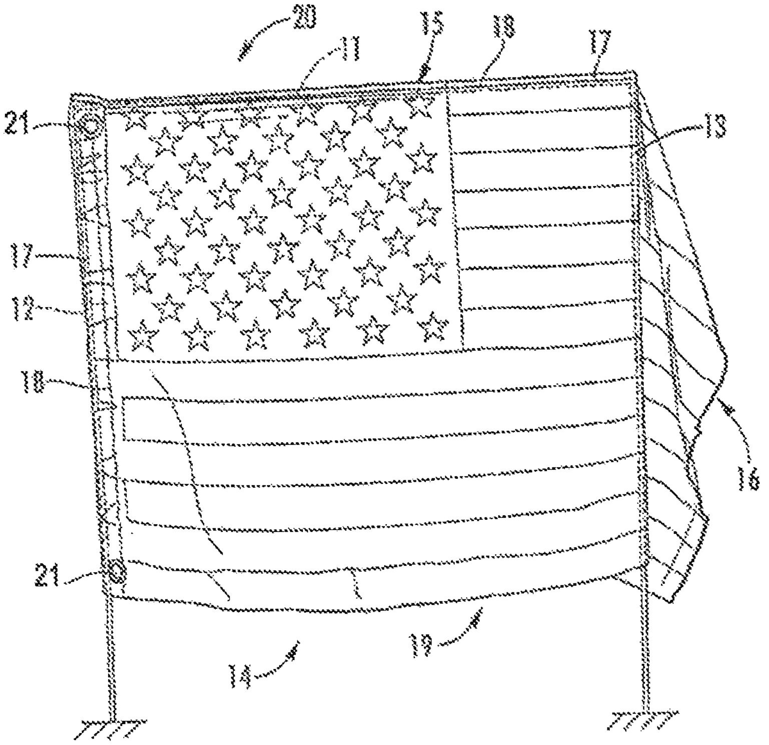
FIG. 2 is a front elevation view of a first embodiment of the flag display apparatus of the present invention showing the flag being supported by the frame.
Figure 3:
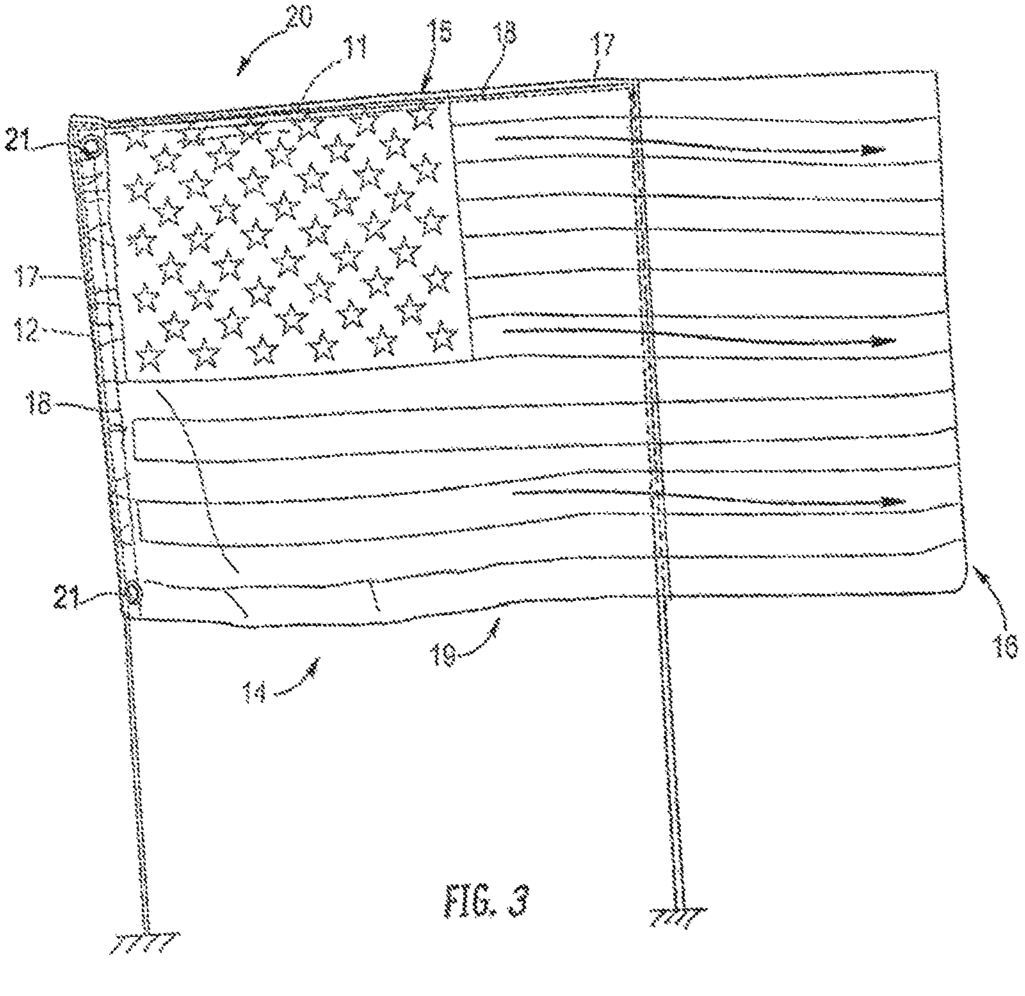
FIG. 3 is a front elevation view of the first embodiment of the flag display apparatus of the present invention when the flag is unfurled by the wind.
Figure 9:
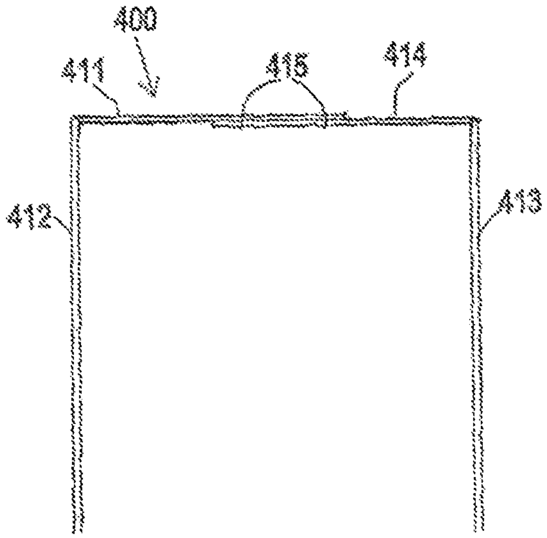
FIG. 9 is a front elevation view of a third embodiment of the frame of the present invention.
Figure 10:
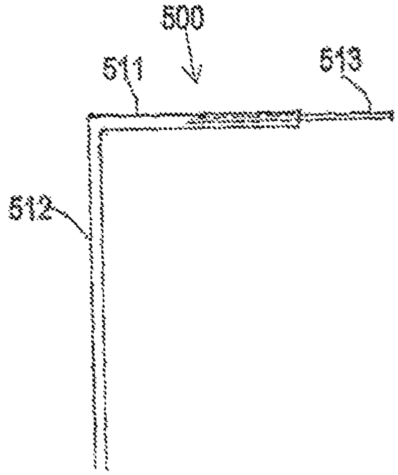
FIG. 10 is a front elevation view of a fourth embodiment of the frame of the present invention.

FIGS. 1-3 illustrate one embodiment of the present invention. FIG. 1 shows a frame 10 comprising a first support leg 12 and a second support leg 13 joined together by a horizontal support member 11. With regard to each embodiment described herein, the length of the horizontal support member is less than the horizontal length (or width) of the flag, as opposed to the height of the flag. The length of the horizontal support member 11 can be less than 90, 80, 70, 60, 50, 40, or 30 percent of the length of the flag. In one or more embodiments as shown in FIGS. 9 and 10, the length of the horizontal member can be adjustable so that the length of the horizontal member can be adjusted between 90 percent and 10 percent of the length of the flag or banner or between 80 percent and 20 percent or between 70 percent and 30 percent or between 60 percent and 40 percent of the length of the flag or banner 14.

FIG. 2 shows the flag or banner display 20, which has been placed in the ground, comprising frame 10 of FIG. 1 supporting flag 14. Flag or banner 14 can include a channel or a sleeve 17 along one or more edges 15 of the flag or banner 14 to allow the flag or banner to be attached to or supported by the frame 10. One or more sleeves 17 may be formed, for example, by folding one or more edges 15 of flag 14 and attaching edge 15 to flag 14 by, for example, stitching 18. Alternatively, a separate piece of material can be folded and sewn along one or more edges 15 or portions of edges of flag 14 to form a sleeve or channel 17. For example, as shown in FIG. 2, a piece of fabric 21 is folded over and sewn along the vertical edge of the flag 14 to provide stitching 18 to form sleeve or channel 17. A sleeve or channel can also be formed along the upper horizontal edge of the flag or banner in the same manner. Additionally, the flag or banner 14 can be folded completely or partially around the second support leg 13 and attached, such as by stitching, partially or completely along the length or perimeter of the flag or banner. The flag or banner can include openings 21, such as eyelets, that can be used to attach the flag or banner 14 to frame 10 as further described herein.

Flag 14 extends beyond the end of horizontal member 11 so that a first portion 19 of the flag is unfurled while a second portion 16 of flag 14 hangs downwardly and is furled or partially furled and is capable of waiving freely. Thus, flag display 20 presents the flag or banner 14 in a partially unfurled configuration in the absence of wind and allows the second portion 16 of the flag or banner 14 to unfurl and wave in the presence of wind. The flag or banner 14, the first portion 19 of which remains at least partially unfurled, can be recognized even in the absence of wind. The flag or banner 14 is not completely held by the frame 10 so that the second portion 16 of the flag or banner can unfurl and/or wave in the presence of wind thereby drawing attention to the flag and/or banner 14. As shown in FIG. 3, in the presence of sufficient wind, the portion 16 of the flag 14 that hangs downwardly off of frame 10 can completely unfurl and wave in the wind. Thus, the present invention can provide a flag or banner display that can restrain or limit the movement of one portion of the flag or banner and allow another portion of the flag or banner to move (e.g., wave, swing, unfurl, soar, or flutter) based on differing wind conditions (e.g. light winds, strong winds, or gusty winds).

Figure 4:
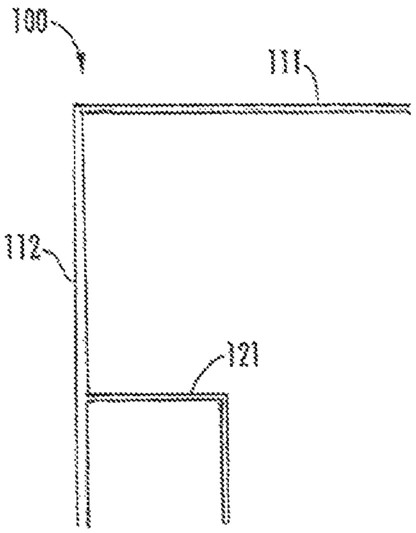
FIG. 4 is a front elevation view of the frame of a second embodiment of the present invention.
Figure 5:
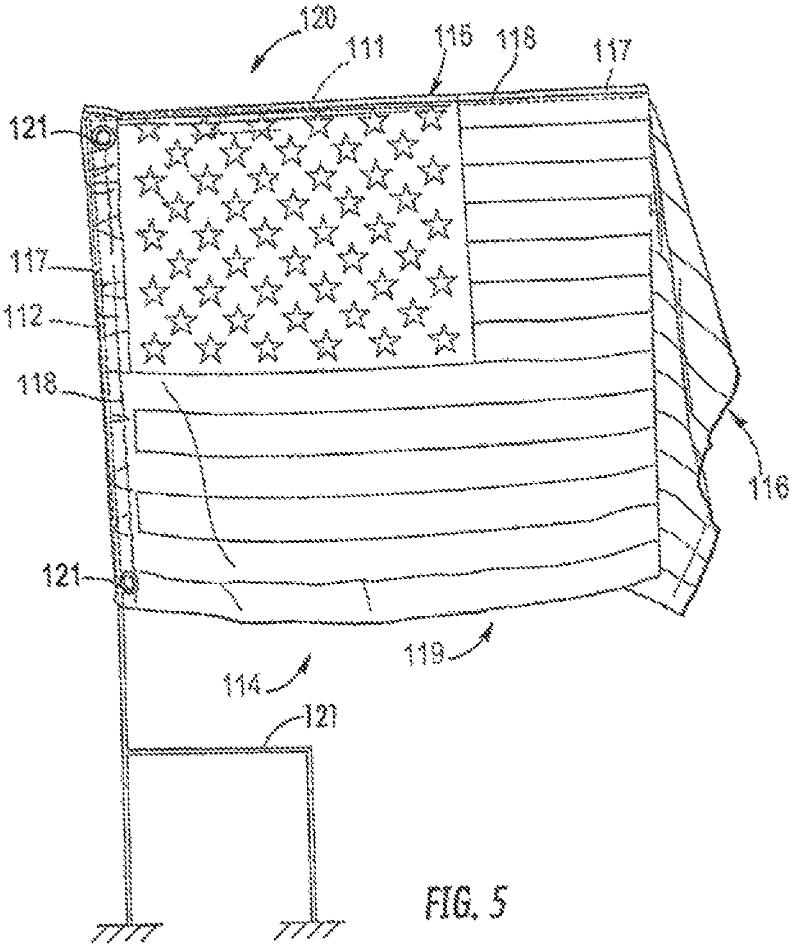
FIG. 5 is a front elevation view of a second embodiment of the flag display apparatus of the present invention showing the flag being supported by the frame.
Figure 6:
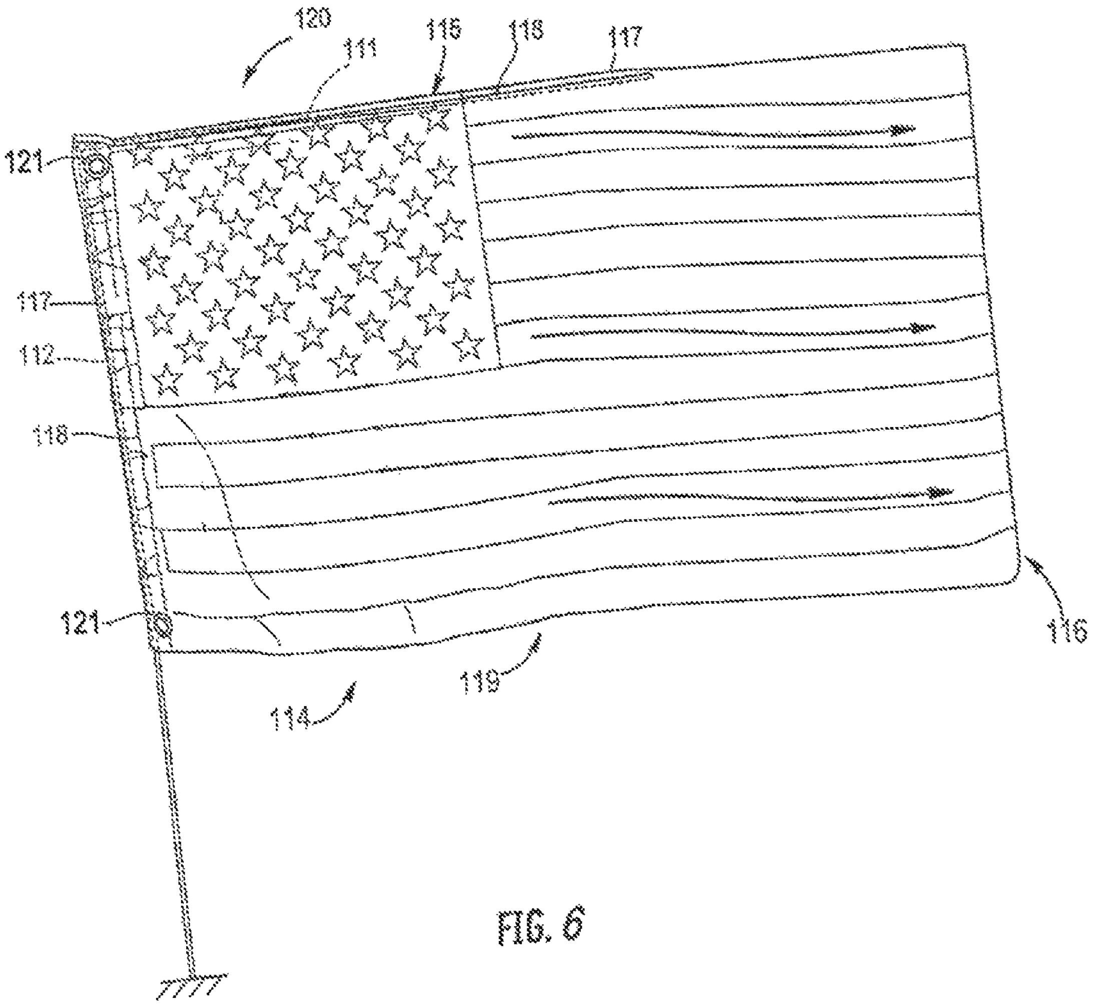
FIG. 6 is a front elevation view of a second embodiment of the flag display apparatus of the present invention when the flag is unfurled by the wind.

FIGS. 4-6 illustrate a second embodiment of the present invention. FIG. 4 shows a frame 100 comprising a support leg 112 and a horizontal support member 111 connected to the support leg 112. Optional reinforcement members (not shown) may extend between and connect support leg 112 to horizontal support member 111. A leg anchor 121 can be connected to the support leg 112 to provide additional stability to the frame 100 when the support leg 112 is inserted into the ground.

FIG. 5 shows a flag or banner display 120, including frame 100 of FIG. 4, supporting a flag 114. Flag 114 typically includes a channel or sleeve 117 along one or more edges 115 of the flag to allow the flag 114 to be attached to and supported by the frame 100. One or more sleeves 117 may be formed, for example, by folding one or more edges 115 of the flag and stitching the edge to the flag using thread 118. Because flag 114 extends beyond the end of horizontal support member 111, a portion 119 of flag 114 is unfurled even during the absence of wind while another portion 116 of the flag 114 hangs downwardly in a furled or partially furled manner depending upon the presence or absence of wind. FIG. 6 shows the flag or banner display apparatus described in FIG. 5. As shown in FIG. 6, in the presence of sufficient wind, the portion 116 of flag 114 that hangs downwardly off of frame 10 can completely unfurl and waive in the wind.

When the flags or banners are to be displayed, the support legs 12, 13, 112 of frames 10, 100 of flag display apparatuses 20, 120 can be inserted into the ground. Additionally, with regard to the first embodiment shown in FIGS. 1-3, the first and second support legs 12, 13 can be held generally parallel to each other when being inserted into the ground so that the portion of the flag between the legs remains generally taut. Alternatively, where frame 10 is flexible, the first and second support legs 12, 13 can be forced toward each other so that the portion 19 of the flag 14 between the support legs 12, 13 is not taut and is capable of waving in response to movement of wind around the flag. In yet another embodiment, one portion of frames 10, 100 may be flexible and the remaining portion of the frame may be rigid. For example, one or more of the support legs 12, 13, 112 may be rigid and one or more of the horizontal members 11, 111 may be flexible or vice versa. In a further embodiment of the flag or banner display described with respect to FIGS. 1-3, the horizontal member can be omitted so that the frame 10 comprises first and second legs 12, 13. When placing the flag or banner display, the first and second legs 12, 13 can be placed into the ground so that the first portion 19 of the flag or banner 14 is taut (i.e., not slack) or the first and second legs 12, 13 can be placed into the ground so that the first portion 19 is slack or partially extended. When the first portion 19 of the flag or banner 14 is slack, the first portion can move in the presence of the wind and can draw attention to the flag or banner 14 together with the second portion 16 of the flag or banner that can move (e.g., wave) in the presence of the wind.

FIG. 9 shows frame 400 comprising a horizontal support member comprising two horizontal segments 411, 414 attached to each support leg 412, 413 respectively. The horizontal segments 411, 414 are in an overlapping and slidable relationship with one another so that the distance between support legs 412, 413 can be lengthened or shortened, which controls the degree to which a first portion of a flag or banner (for example first portion 19 of flag or banner 14 in FIG. 3) is extended or partially extended between the support legs 412. As shown in FIG. 10, the horizontal support member can comprise a telescoping tube comprising a larger horizontal diameter support tube 511 and a smaller horizontal support tube 513 slidably disposed at least partially inside the larger horizontal support tube 511 to allow the combined length of support members 511, 513 to be extended or shortened to provide for different visual presentation of the flag display apparatus. Thus, decreasing the combined length of horizontal members 411, 414 and 511,

513 can decrease the width of the unfurled portions of the flags (not shown) attached to and supported by frames 400 and 500, while increasing the combined length of horizontal members 411, 414 and 511, 513 increases the width of the unfurled portions of the flags (not shown) attached to and supported by frames 400 and 500.

The support legs and the horizontal support members of the present invention shown in FIGS. 1-11 typically have a circular cross-section but may also have any cross-section, including oval, square, rectangular, and hexagonal. The support legs and horizontal member may be solid (i.e., a rod) or hollow (i.e., a tube) as is required for horizontal support member 511 shown in FIG. 10 to provide for a telescoping horizontal member. The support legs and horizontal members of the various embodiments of the present invention can be made of metal, plastic, or wood. For example, the support legs and horizontal members may be made of galvanized steel or aluminum, or fiberglass, polyvinyl chloride, polypropylene, polyethylene, polyester, and vinyl. Preferably, the support legs and horizontal members comprising the frames of the present invention are made of the same type of material, but the support legs and horizontal members may be made of different materials and of different thicknesses or configurations, such as noted above. One part, such as the leg or legs, of the frame can be flexible while the remaining part of frame, such as the horizontal member, can be rigid. For example, referring to FIGS. 1-10, the support leg or legs can be made of galvanized steel with a sufficient diameter to provide a rigid support for the display so that the support leg or legs do not bend or flex when being inserted into soil, while the horizontal member is made of plastic with a sufficient diameter to provide support for the flag or banner but also to provide flexibility when the flag or banner display is being packaged for distribution or are being inserted into the soil. In one embodiment, the support legs and/or horizontal members can be made of fiberglass or other material of sufficiently small diameter so that the support legs and/or horizontal members are capable of being folded, rolled up, or twisted to allow the frames to occupy a smaller area or volume to facilitate shipping and/or storage yet of sufficient diameter so that the flags are supported when displayed. Thus, in one embodiment, for example, the fiberglass support legs can have a larger diameter or cross-section than the horizontal support member, while in another embodiment, the fiberglass support legs can have a smaller diameter or cross-section than the horizontal support member. When the flag or banner display shown in FIGS. 1-3 does not include the horizontal support member 11, the flag or banner display can be easily rolled up or folded to facilitate shipping and/or storage.

Figure 7:
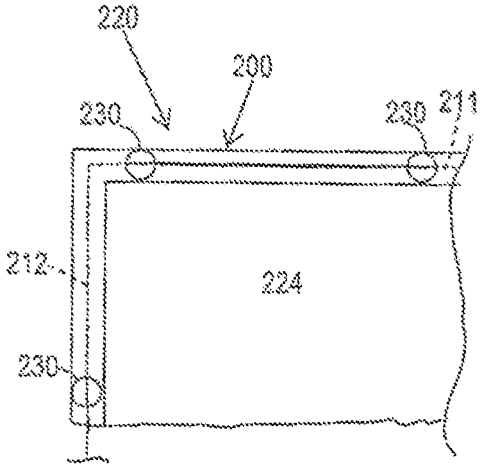
FIG. 7 is a front elevation view (partial) of a third embodiment of the flag display apparatus of the present invention.
Figure 8:
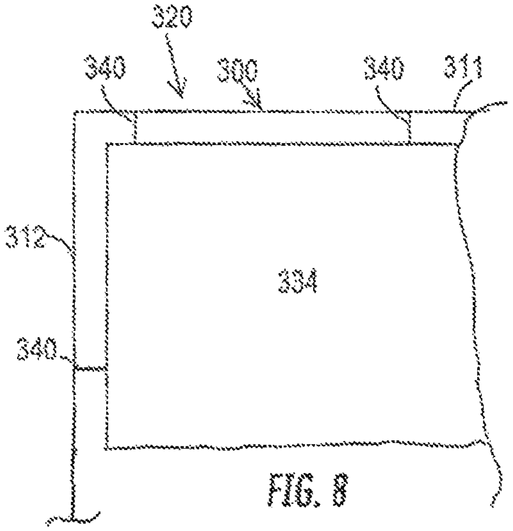
FIG. 8 is a front elevation view (partial) of a fourth embodiment of the flag display apparatus of the present invention.

A flag or banner may be attached to a frame for displaying the flag or banner using any suitable means, such as or in addition to, the sleeves and/or stitching shown in FIGS. 1-6. FIG. 7 shows a flag or banner display 220 with frame 200 supporting flag 224. Flag or banner 224 is attached to frame 200 by three openings, for example, rings or eyelets 230, located along a vertical and/or horizontal edge of flag 224. The openings 230 on the flag or banner can slide over leg 212 and horizontal support member 211 to position the flag 224 on frame 200. FIG. 8 shows yet another embodiment where flag or banner 334 is attached to frame 300 using strips of hook and loop fasteners, such Velcro® hook and loop fasteners (Velcro is a registered trademark of Velcro Industries B.V.) or loops of material 340, such as loops of fabric, wire, or cable ties. Any combination of rings, hook and loop fastener strips, or loops can be used. The flag or banner 334 can also be attached to the frame with binder clips, which are available from ACCO Brands Corporation. The binder clips may include a rubber or plastic material lining the inside of the binder clip to improve the grip strength of the binder clips. The rubber or plastic material can comprise, for example, pieces of rubber cut from the inner tube of a bicycle tire. For example, a rectangular piece can be cut from the inner tube that approximates the inner surface of the binder clip. The piece of rubber can be folded over the flag and the frame at a predetermined location and the binder clip can then be placed over the piece of rubber. Alternatively, the piece of rubber can be attached to the inner surface of the binder clip by, for example, an adhesive. The rubber or plastic material can increase the amount of force required to pull the flag out of the binder clip. Preferably at least three rings, hook and loop fastener strips, loops, binder clips, or combinations thereof can be used to attach flags 224, 324 to frames 200, 300 with at least one opening or eyelet 230, hook and loop fastener strip or loop 340 being attached to support leg 212, 312 and at least two rings 230 or hook and loop fastener strip or loop 340.

Figure 11:
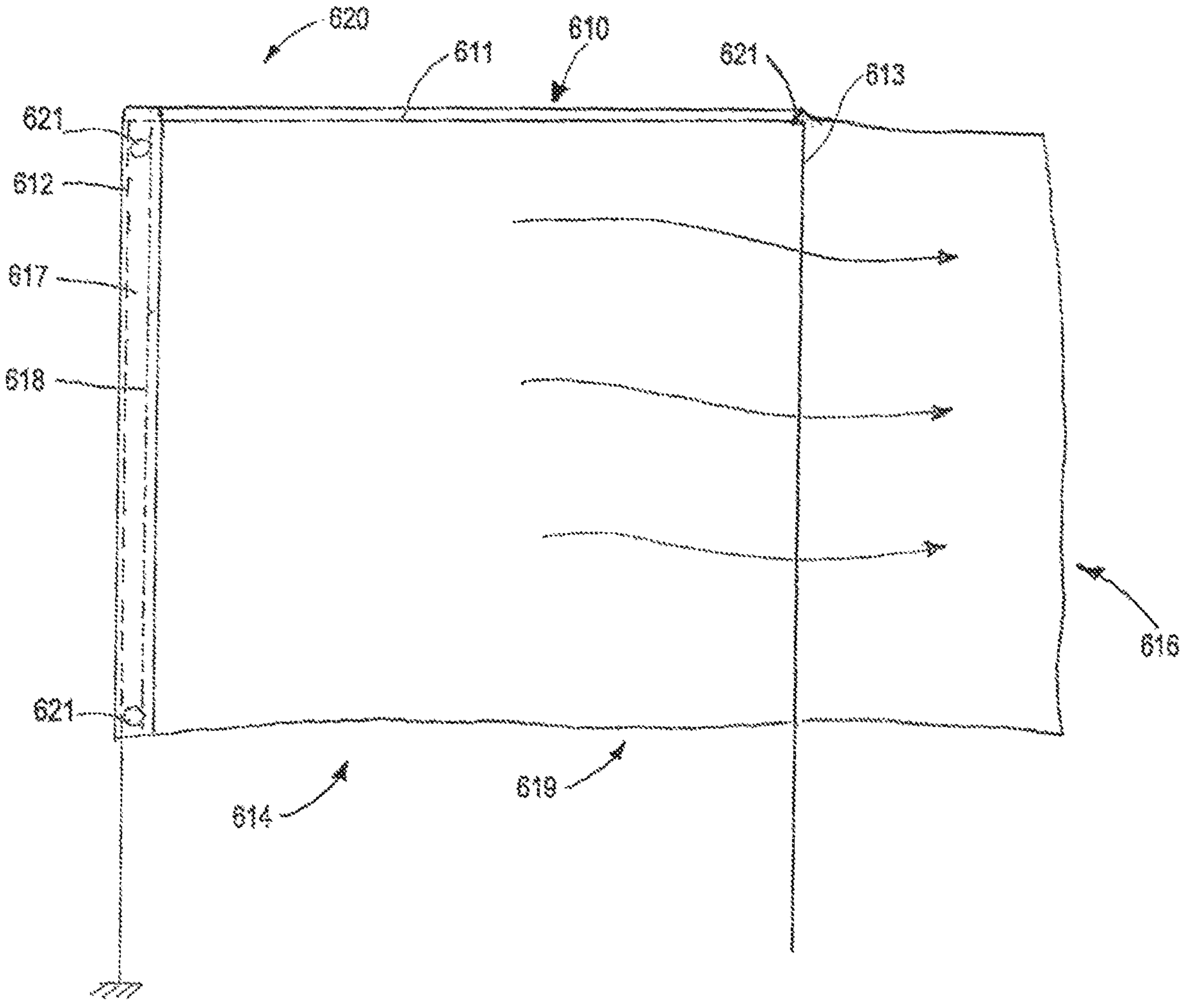
FIG. 11 is a front elevation view of an embodiment of the flag display apparatus of the present invention.

FIG. 11 is a front elevation view of an embodiment of the flag or banner display apparatus 620 that includes a frame 610 such as frame 10 shown in FIG. 1 and a flag or banner 614 having first and second portions 619. Frame 610 includes first and second support legs 612, 613 and a horizontal support member 611 connecting the upper ends of the support legs. Leg 612 extends through sleeve 617, which can be formed by folding a side of the flag or banner 614 over leg 612 and providing stitching 618 along the edge of the side of the flag or banner or by folding a strip of fabric 620 over the side of the flag or banner 614. The flag or banner 614 is also connected by, for example, stitching 621 to the horizontal support member 611 and/or to the second support leg 613 at or adjacent the intersection of the horizontal support member 611 and the second support leg 613. Hook and loop fastener strips, loops, binder clips or other suitable means can be used instead of stitching 621. The flag or banner displays described herein allow flags or banners to be placed, moved and/or removed quickly with minimum effort.

In the specification and/or figures, examples of embodiments have been disclosed. The present invention is not limited to such exemplary embodiments. Unless otherwise noted, specific terms have been used in a generic and descriptive sense and not for purposes of limitation. The use of the term "and/or" includes any and all combinations of one or more of the associated listed items.

That which is claimed is:

1. A flag display comprising:

a flag mounted to a frame, wherein:

the frame comprises first and second support legs each having upper and lower portions, and a horizontal member connected to the upper portion of the first support leg;

the flag comprises first, second, third, and fourth edges that define a periphery of the flag;

the first edge extends upright along the upper portion of the first support leg;

a first portion of the second edge extends along the horizontal member from the upper portion of the first support leg toward the upper portion of the second support leg;

the third edge is a free edge;

a second portion of the second edge is a free edge extending from the upper portion of the second support leg to the third edge;

a first portion of the fourth edge is a free edge extending from the second support leg to the third edge;

a second portion of the fourth edge extends from the first edge to the first portion of the fourth edge;

a first flag portion extends between the first support leg and the second support leg;

a second flag portion extends between the second support leg and the third edge; and each of the lower portion of the first support leg and the lower portion of the second support leg extends downwardly away from the flag and is configured to be inserted into ground.

2. The flag display of claim 1, wherein the second portion of the second edge, the third edge, the first portion of the fourth edge, and the upper portion of the second support leg define the second flag portion that is configured to be furled in the absence of wind and is configured to be unfurled in the presence of wind.

3. The flag display of claim 1, wherein the horizontal member comprises a first opposed end connected to the upper portion of the first support leg, and a second opposed end connected to the upper portion of the second support leg.

4. The flag display of claim 1, wherein the first edge includes a sleeve.

5. The flag display of claim 1, wherein the first edge includes an eyelet.

6. The flag display of claim 1, wherein the first portion of the second edge includes a sleeve.

7. The flag display of claim 1, wherein the first portion of the second edge includes an eyelet.

8. The flag display of claim 1, wherein the flag has a predetermined length and the horizontal member has a length that is less than 60 percent of the predetermined length of the flag.

9. The flag display of claim 1, wherein the first edge is attached to the upper portion of the first support leg.

10. The flag display of claim 9, wherein the first edge is attached to the upper portion of the first support leg by stitching.

11. The flag display of claim 9, wherein the first edge is attached to the upper portion of the first support leg by a hook and loop fastener.

12. The flag display of claim 1, wherein the first portion of the second edge is attached to the horizontal member.

13. The flag display of claim 12, wherein the first portion of the second edge is attached to the horizontal member by stitching.

14. The flag display of claim 1, wherein the horizontal member is comprised of first and second horizontal segments that are slidably connected.

15. The flag display of claim 14, wherein the first and second horizontal segments overlap each other.

16. The flag display of claim 14, wherein the flag has a predetermined length and wherein the first and second segments of the horizontal member are configured to be adjusted so that the length of the horizontal member can be between 80 percent and 20 percent of the predetermined length of the flag.

17. A flag display comprising:

a flag mounted to a frame, wherein:

the frame comprises first and second support legs each having upper and lower portions, and a horizontal member connected to the upper portion of the second support leg;

the flag comprises first, second, third, and fourth edges that define a periphery of the flag;

the first edge extends upright along the upper portion of the first support leg;

a first portion of the second edge extends along the horizontal member from the upper portion of the second support leg toward the upper portion of the first support leg;

the third edge is a free edge;

a second portion of the second edge is a free edge extending from the upper portion of the second support leg to the third edge;

a first portion of the fourth edge is a free edge extending from the second support leg to the third edge;

a second portion of the fourth edge extends from the first edge to the first portion of the fourth edge;

a first flag portion extends between the first support leg and the second support leg;

a second flag portion extends between the second support leg and the third edge; and each of the lower portion of the first support leg and the lower portion of the second support leg extends downwardly away from the flag and is configured to be inserted into ground.

18. The flag display of claim 17, wherein the second portion of the second edge, the third edge, the first portion the fourth edge, and the upper portion of the second support leg define the second flag portion that is configured to be furled in the absence of wind and is configured to be unfurled in the presence of wind.

19. The flag display of claim 17, wherein the horizontal member is comprised of first and second horizontal segments that are slidably connected.

20. The flag display of claim 17, wherein the flag is attached to the upper portion of the second support leg by stitching.

* * * * *